United States Patent
Ueyoko et al.

(10) Patent No.: US 6,820,670 B1
(45) Date of Patent: Nov. 23, 2004

(54) PNEUMATIC TIRE

(75) Inventors: Kiyoshi Ueyoko, Kobe (JP); Shinichi Miyazaki, Kobe (JP); Kazuki Numata, Shirakawa (JP); Tsuneyuki Nakagawa, Shirakawa (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/655,842

(22) Filed: Sep. 6, 2000

(30) Foreign Application Priority Data

Sep. 6, 1999 (JP) ............................................ 11-251967

(51) Int. Cl.$^7$ ........................... B60C 15/04; B60C 15/06
(52) U.S. Cl. ........................ 152/539; 152/542; 152/543; 152/546; 245/1.5
(58) Field of Search ................................. 152/539, 540, 152/547, 542; 156/132

(56) References Cited

U.S. PATENT DOCUMENTS

| | | | |
|---|---|---|---|
| 2,904,095 A | | 9/1959 | Engstrom |
| 3,949,800 A | * | 4/1976 | Lejeune ...................... 152/540 |
| 4,088,169 A | | 5/1978 | Kuroda |
| 4,319,622 A | * | 3/1982 | Iuchi et al. .................. 152/540 |
| 4,462,448 A | | 7/1984 | Kawaguchi et al. |
| 6,273,162 B1 | * | 8/2001 | Ohara et al. ................. 152/540 |

* cited by examiner

Primary Examiner—Blaine Copenheaver
Assistant Examiner—Justin Fischer
(74) Attorney, Agent, or Firm—Birch, Stewart, Kolasch & Birch, LLP

(57) ABSTRACT

A pneumatic tire comprises a pair of bead portions each provided therein with a bead core made of windings of at least one wire, a carcass ply of cords extending between the bead portions and turned up around the bead core from the axially inside to the outside of the tire to form a pair of turnup portions and a main portion therebetween, a rubber bead apex disposed radially outside the bead core and between each said turnup portion and the main portion, and a fiber reinforced rubber spacer interposed between the bead core and the carcass ply to provide a positive distance between the carcass ply cords and bead core wire. The fiber reinforced rubber spacer has a securing portion which extends radially outwardly and axially outwardly from the axially inside of the bead core while separating from the bead core but contacting with the rubber bead apex. A distance (L1, L2) between an outermost point of the securing portion and the bead core is in a range of from 0.05 to 1.0 times a height of the bead core.

2 Claims, 3 Drawing Sheets

PNEUMATIC TIRE

The present invention relates to a pneumatic tire, more particularly to a bead structure being capable of improving the bead durability.

In general, a pneumatic tire is provided in each bead portion with a bead core as a tension member. And the carcass is secured to the bead core by folding back its edge around the bead core.

The bead core is usually made of windings of at least one steel wire. In order to bind the windings to improve the handling during tire making processes, sometimes a canvas tape is tightly wound therearound.

On the other hand, as disclosed in U.S. Pat. No. 5,772,811 or European Patent 749855 equivalent thereto, we have proposed a heavy duty tire in which a bead apex rubber disposed immediately radially outside the bead core is minimized, whereas the bead portion of a heavy duty tire is conventionally reinforced with a large volume of bead apex rubber and bead reinforcing layers.

In such tire, therefore, the bead portion is relatively supple and deformation or deflection of the bead portion during running is relatively large. As a result, the carcass tension becomes especially large on the axially inside of the bead core. Therefore, it is very important to prevent the carcass cords from contacting with the bead wire to prevent the carcass cords from being cut. Further, a large sharing stress occurs between the bead apex rubber and the outer face of the bead core. Therefore, it is important to prevent the bead apex rubber from separating from the bead core by mitigating the sharing stress and/or improving the resistance to sharing stress.

If the bead core with a canvas tape is used in such tire, the carcass cords can be prevented from contacting with the bead wire for the moment, but the canvas is liable to be broken in use. And it can not prevent the separation between the bead apex rubber and the bead core. Thus, it is difficult to improve the durability of the bead portion.

It is therefore, an abject of the present invention to provide a pneumatic tire in which the above-mentioned drawbacks are resolved and the bead durability is effectively improved.

According to the present invention, a pneumatic tire comprises a pair of bead portions each provided therein with a bead core made of windings of at least one wire, a carcass ply of cords extending between the bead portions and turned up around the bead core from the axially inside to the outside of the tire to form a pair of turnup portions and a main portion therebetween, a rubber bead apex disposed radially outside the bead core and between each turnup portion and the main portion, a fiber reinforced rubber spacer interposed between the bead core and the carcass ply to provide a positive distance between the carcass ply cords and bead core wire, the fiber reinforced rubber spacer having a securing portion which extends radially outwardly and axially outwardly from the axially inside of the bead core while separating from the bead core but contacting with the rubber bead apex, and a distance (L1, L2) between an outermost point of the securing portion and the bead core being in a range of from 0.05 to 1.0 times a height of the bead core.

Embodiments of the present invention will now be described in detail in conjunction with the accompanying drawings.

Figure 1:
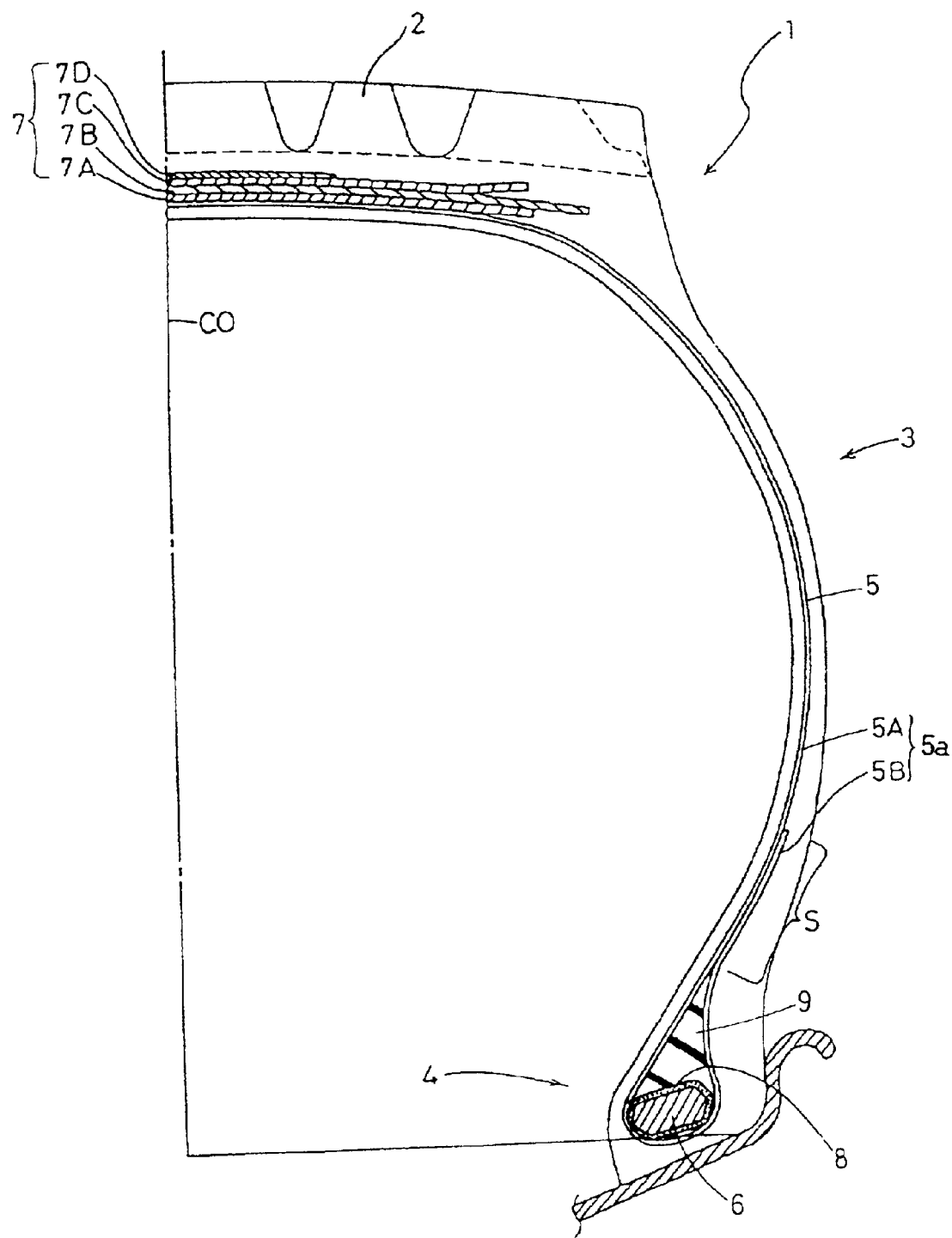
FIG. 1 is a cross sectional view of a tire according to the present invention.

In the drawings, a pneumatic tire according to the invention comprises a tread portion 2, a pair of axially spaced bead portions 4 with a bead core 6 therein, a pair of sidewall portions 3 extending between the tread edges and the bead portions 4, a carcass 5 extending between the bead portions 4, and a belt 7 disposed radially outside the carcass 6 in the tread portion 2. The pneumatic tire shown in FIG. 1 is a heavy duty radial tire for trucks and buses.

The belt 7 comprises four plies: a radially innermost first ply 7A of steel cords laid at an angle of from 50 to 70 degrees with respect to the tire equator CO; and radially outer second, third and fourth plies 7B, 7C and 7D of steel cords laid at angles of not more than 30 degrees with respect to the tire equator CO. With respect to the tire equatorial plane CO, the steel cords of the first and second plies 7A and 7B are inclined toward the same direction. The steel cords of the third and fourth plies 7C and 7D are inclined toward the same direction but reverse to the first and second plies 7A and 7B.

The carcass 5 comprises at least one ply of rubberized cords arranged radially at an angle of from 90 to 70 degrees with respect to the tire equatorial plane C, and extending between the bead portions 4 through the sidewall portions 3 and the tread portion 2, and turned up around the bead core 6 in each bead portion 4 from the axially inside to the outside thereof to form two turned up portion 5B and one main portion 5A therebetween. For the carcass cords, organic fiber cords, e.g. nylon, rayon, polyester, aromatic polyamide and the like or steel cords can be used. In this example, the carcass 5 is composed of a single ply of rubberized steel cords.

Each bead portion is provided between the main portion 5A and turnup portion 5B with a rubber bead apex 9 extending and tapering radially outwards from the bead core 6.

The radially outer end of the bead apex 9 is positioned radially inwards of the maximum tire section width point. The carcass ply turnup portion 5B extends radially outwardly beyond the radially outer end of the bead apex 9 so as to adjoin or almost contact with the carcass main portion 5A to form an adjoining region S.

As regards the structure other than the bead core such as the adjoining region S, the profile of the carcass, the profile of the tire and the like, the disclosure of U.S. Pat. No. 5,772,811 or European Patent 749855 equivalent thereto including specification, claims and drawings incorporated herein by reference in its entirety.

The bead core 6 is formed by compactly winding at least one steel wire 6a. The wire 6a may be wound in various shapes for example, a circle, rectangle, triangle and the like. But in this embodiment, as shown in FIG. 2, the wire 6a is wound in a flat hexagonal shape having six vertexes 61, 62, 63, 64, 65 and 66, and an outer face 6A between the vertexes 63 and 64 is parallel with an inner face 6B between the vertexes 65 and 66.

In case of a flat hexagon, rectangle or triangle, the bead core 6 is embedded in the bead portion 4 such that an inner face 6B is almost parallel to the bottom of the bead portion 4.

As the tire in this embodiment is designed to be mounted on a 15-degree-taper rim of which bead seats are inclined at 15 degrees, the inner face 6B is inclined at an angle β in the range of from 13 to 17 degrees with respect to the axial line x. If the difference between the inclining angle β and the inclining angle of the bead bottom is more than 2 degrees, the engage of the tire bead portions 4 with the bead seats becomes not good.

Figure 2:
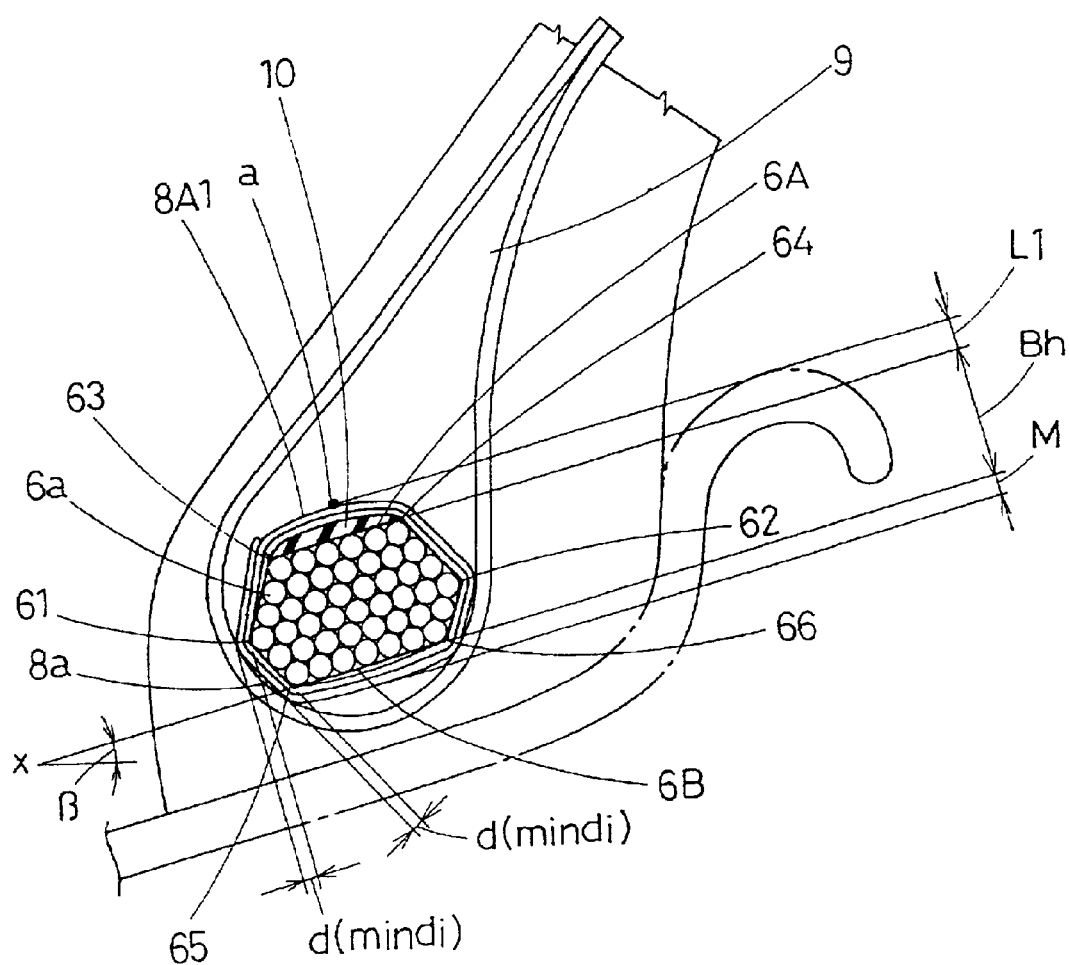
FIG. 2 is an enlarged cross sectional view of the bead portion thereof showing an example of the fiber reinforced rubber spacer.

As to the number of the windings, when some of the windings aligned along the inner face 6B are regarded as a radially innermost first layer, the windings shown in FIG. 2 has six layers in total, and the numbers of windings in these layers are 7, 8, 9, 8, 7 and 6 from the radially inner first layer to the radially outermost layer. In this example, therefore, the third layer has the maximum number and it is widest. Preferably, the total number of windings in the layer(s) inside the widest layer, that is, the first and second layers are set to be smaller than the total number of windings in the layer(s) outside the maximum layer, that is, the fourth, fifth and sixth layers.

According to the present invention, a fiber reinforced rubber spacer 8 is disposed between the bead core 6 and the carcass 5.

The fiber reinforced rubber spacer 8 is made of at least one rubber strip 8b (8b1, 8b2) reinforced with organic fibers. In this embodiment, a strip of rubberized woven fabric is used. But, a strip of rubberized nonwoven fabric in which organic fiber cords are laid in parallel with each other and a strip of a bonded-fiber fabric permeated with rubber may be also used.

For the material of the organic fibers, nylon, aromatic polyamide, polyester, rayon and the like can be used. But, nylon, especially nylon-6 is preferably used for the good adhesion to rubber.

Preferably, the rubber of the fiber reinforced rubber spacer 8 has a JIS hardness in the range of from 50 to 85.

FIG. 2 shows an example of the fiber reinforced rubber spacer 8 which is formed by loosely winding a single strip 8b twice around the bead core 6 so that a slack is formed over the radially outer face 6A of the bead core 6. Between the slack portion 8A1 of the spacer 8 and the radially outer face 6A of the bead core 6, a rubber layer 10 is inserted. For the rubber layer 10, a separate rubber strip is used. But it may be possible to use the coating rubber for the bead wire and/or the topping rubber for the fiber reinforced rubber spacer 8 as a part of the rubber layer 10. It is preferable that the hardness of the rubber layer 10 is more than that of the bead apex 9, whereby the sharing stress between the bead apex 9 and bead core 6 is effectively dispersed and mitigated. However, it is also possible that the hardness is less than or the same as the hardness of the bead apex 9.

The distance L of the most distant point (a) of the slack portion BA1 from the outer face 6A of the bead core 6 is set in the range of from 0.05 to 1.0 times the height Bh of the bead core 6. Here, the distance L1 and the height Bh are measured perpendicularly to the bottom of the bead portion 4, when the tire 1 is mounted on a standard rim and inflated to a standard pressure. In this embodiment, there is no rubber layer intentionally disposed between the bead core 6 and the portion other than the slack portion 8A1. Thus, such portion substantially contact with the bead core. However, there is a possibility that a sag is formed under the bead core due to tire making processes. Such a slack is acceptable as far as the amount M is negligible.

FIGS. 3a, 3b, 3c and 3d show other examples of the fiber reinforced rubber spacer 8.

Figure 3D:
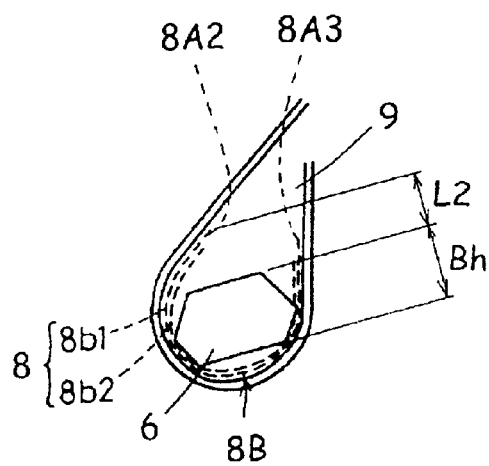
FIGS. 3a, 3b, 3c and 3d are schematic cross sectional views each showing another example of the fiber reinforced rubber spacer.
Figure 3C:
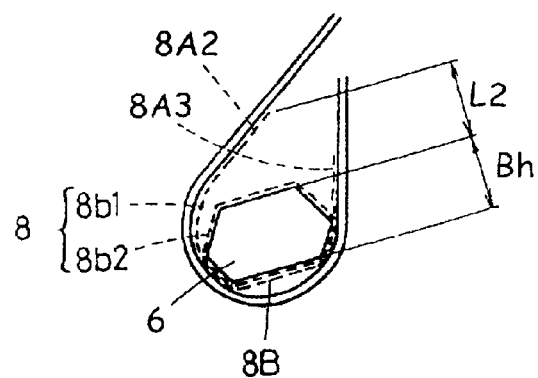
Figure 3B:
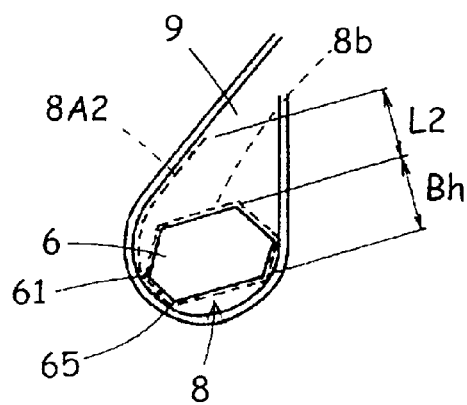
Figure 3A:
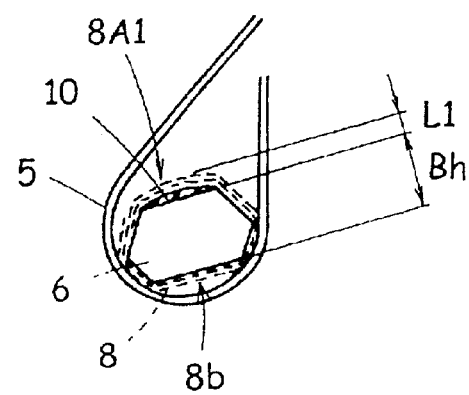

FIG. 3a shows a modification of the fiber reinforced rubber spacer 8 shown in FIG. 2. In this example, the fiber reinforced rubber spacer 8 is formed by loosely winding a single strip 8b around the bead core 6 more than twice but less than three times so that the slack portion 8A1 becomes triple. As explained above, the rubber layer 10 is inserted between the slack portion 8A1 and the bead core 6 to improve the adhesion.

In FIG. 3b, the fiber reinforced rubber spacer 8 is formed by winding a single strip 8b around the bead core 6 more than once but less than twice. The winding starts from a position beneath the inner face 6B of the bead core 6. In FIG. 3b, the winding direction is clockwise. At the vertexes 61 and 65, the strip 8b is doubled. From the radially innermost vertex 61, the strip extends radially outwardly while separating from the previous winding. This radially outwardly extending portion 8A2 extends between the carcass main portion 5A and the bead apex 9 while directly contacting with the axially inner surface of the bead apex 9. The distance L2 of the most distant point or the radially outer end of the radially outwardly extending portion 8A2 from the outer face 6A of the bead core 6 is set in the range of from 0.05 to 1.0 times the height Bh of the bead core 6. Here, the distance L2 is measured perpendicularly to the bottom of the bead portion 4, when the tire 1 is mounted on the standard rim and inflated to the standard pressure. In FIG. 3b, the slack portion A1 is not formed. But it can be formed as explained above. Therefore, due to the portion 8A2 and the optional portion 8A1, the adhesion between the bead apex 9 and bead core 6 can be improved.

In FIG. 3c, the fiber reinforced rubber spacer 8 is composed of two strips 8b and 8b2. The strip 8b2 adjacent to the bead core 6 is wound at least once around the bead core 6. The strip 8b disposed outside the wound strip 8b2 is however turned into a U-shape to have a base portion 8B, an axially inner portion 8A2 and an axially outer portion 8A3. The base portion 8B is adjacent to the inner face 6B of the bead core 6. The axially inner portion 8A2 and axially outer portion 8A3 extend radially outwardly from the base portion 8B along the carcass ply main portion 5A and turnup portion 5B, respectively. The distance L2 of the most distant point or the radially outer end of the axially inner portion 8A2 from the outer face 6A of the bead core 6 is set in the range of from 0.05 to 1.0 times the height Bh of the bead core 6. The distance L2 is measured as explain in the former example. In FIG. 3c, the slack portion 8A1 is not formed. But it can be formed as explained above.

In FIG. 3d, the fiber reinforced rubber spacer 8 is composed of two strips 8b1 and 8b2 which are turned around the bead core 6. Each of the strips 8b1 and 8b2 comprises a base portion 8B. an axially inner portion 8A2 and an axially outer portion 8A3 as in the former example. The distance L2 of the radially outer end of the axially inner portions 8A2 from the outer face 6A of the bead core 6 is set in the range of from 0.05 to 1.0 times the height Bh of the bead core 6.

On the other hand, the distance (d) between the adjacent carcass cords and bead wire 6a becomes decreased at the vertexes of the cross-sectional shape of the bead core 6. In order to prevent the carcass cords from being cut by the bead wire in use, the distance (d) must be more than 0.1 mm, preferably more than 0.5 mm, more preferably more than 0.75 mm. However, at the vertexes at which a large compressive stress occurs between the bead core 6 and carcass 5, the distance (d) should not be set at a large value to prevent heat generation and thereby prevent separation failure. Therefore, the distance (d) is set in the range of less than 4.0 mm, preferably less than 2.5 mm. more preferably less than 2 mm. In case of the hexagonal cross-sectional shape shown in FIG. 2, such vertexes are the axially innermost vertex 61, the axially outermost vertex 62, the radially inner vertexes 65 and 66. Therefore, at the vertexes 61, 62, 65 and 66, the distance (d) is more than 0.1 mm but less than to 4.0 mm. Further, it can be said that the most preferable condition is "more than 0.75 mm but less than to 2.0 mm". If the distance (d) is less than 0.1 mm, the carcass cords easily contact with the bead wire and they are liable to be broken. If the distance (d) is more 4.0 mm, the heat generation from the rubber existing between the carcass 5 and bead core 6 increase, and a separation failure due to the temperature rise is liable to occur.

Comparison Tests

Test tires of size 11R22.5 (radial tire for heavy duty use) having the structure shown in FIGS. 1 and 2 and specifications shown in Table 1 were made and tested for the bead durability.

The test tires had the same structure except for the fiber reinforced rubber spacer 8. The principal common specifications are as follows: The carcass was composed of a single ply of steel cords (3×0.2+7×0.23) arranged radially at an angle of 90 degrees with respect to the tire equator. The cord count was 38/5 cm under the bead core. The belt was composed of four plies of parallel steel cords (3×0.2+6×0.35) laid at a cord count of 26/5 cm at angles of 67, 18, 18 and 18 degrees (from the radially inside to outside). The bead core was composed of a 1.55 mm diameter steel wire (piano wire) wound into six layers, and the numbers of windings in the layers are 7, 8, 9, 8, 7 and 6 from the radially inner layer to the outer layer.

In the bead durability test, the tire was mounted on a standard wheel rim (size: 8.25×22.5), and using an indoor tire tester (tire drum), the runable distance to bead damage was measured as the bead durability under the following condition.

Tire load: 9000 kg

Tire pressure: 1000 kPa

Running speed: 20 km/hr

The test results are indicated in Table 1 by an index based on Conventional tire (Conv.) being 100, wherein the larger the index number, the better the bead durability.

TABLE 1

| Tire | Ex. 1 | Ex. 2 | Ex. 3 | Ex. 4 | Ex. 5 | Ex. 6 | Ref. 1 | Conv. |
|---|---|---|---|---|---|---|---|---|
| Fiber reinforced rubber layer | FIG. 2 | FIG. 2 | FIG. 2 | FIG. 2 | FIG. 2 | FIG. 2 | *1 | *2 |
| Thickness (mm) | 1 | 1 | 1 | 1 | 1 | 1 | 1 | 0 |
| Fiber *3 | N6 | PE | N6 | N6 | N6 | N6 | — | — |
| L (mm) | 1.4 | 1.4 | 9.8 | 4 | 0.36 | 4 | — | — |
| Bead Core | FIG. 2 | FIG. 2 | FIG. 2 | FIG. 2 | FIG. 2 | FIG. 2 | FIG. 2 | FIG. 2 |
| Bh (mm) | 8.9 | 8.9 | 8.9 | 8.9 | 8.9 | 8.9 | 8.9 | 8.9 |
| Distance d (mm) *4 | 1.4 | 1.4 | 1.4 | 4.1 | 1.4 | 0.09 | 0.09 | 0 & 0.07 |
| Bead durability | 190 | 180 | 150 | 140 | 120 | 120 | 105 | 100 |

*1 A vulcanized rubber layer containing no organic fiber was wound around the bead core.
*2 A bead core without any wrapping layer was used.
*3 N6: Nylon-6 cord (940 dtex/2)
    Cord count 26/5 cm
    Cord angle 90 degrees
   PE: Polyester cord (1100 dtex/2)
    Cord count 26/5 cm
    Cord angle 90 degrees
*4 Minimum distances (min di) at the vertexes 61 and 65

From the test results, it was confirmed that the tires according to the invention can be remarkably improved in the bead durability.

As described above, in the pneumatic tire according to the present invention, as the fiber reinforced rubber spacer provides a proper distance between the bead wire and carcass cords, the carcass cords can be prevented from breakage, and the heat generation is effectively controlled. Further, the fiber reinforced rubber spacer improves the adhesion between the bead apex and the bead core. Thus, the durability of the bead portion can be effectively improved.

The present invention is suitably applied to pneumatic tires for heavy duty use, but it can be also applied to passenger car tires, motorcycle tires and the like.

What is claimed is:

1. A pneumatic tire comprising a pair of bead portions each provided therein with a bead core made of windings of at least one wire, a carcass ply of cords extending between the bead portions the outside of the tire to form a pair of turnup portions and a main portion therebetween, a rubber bead apex disposed radially outside the bead core and between each said turnup portion and the main portion, a fiber reinforced rubber spacer interposed between the bead core and the carcass ply to provide a positive distance between the carcass ply cords and bead core wire, said fiber reinforced rubber spacer having a securing portion which extends radially outwardly and axially outwardly from the axially inside of the bead core while separating from the bead core but contacting with the rubber bead apex, and a distance (L1, L2) between an outermost point of said securing portion and the bead core being in a range of from 0.05 to 1.0 time a height of the bead core, said fiber reinforced rubber spacer being made of a single rubber strip reinforced with organic fibers, said single rubber strip loosely wound at least once around the bead core to form a slack portion radially outside the bead core, and said securing portion formed by the slack portion, wherein said single rubber strip is wound, starting from a position under the bead core, towards the axially inside of the tire, and after wound one or more times it is continuously wound toward the radially outside, but from a certain point, it separate from the previous winding and extends radially outwardly along the carcass ply main portion while contacting with an axially inside of the rubber bead apex, so that a distance between a radially outer end of this radially outwardly extending portion and the bead core is in a range of from 0.05 to 1.0 times the height of the bead core.

2. A pneumatic tire comprising a pair of bead portions each provided therein with a bead core made of windings of at least one wire, a carcass ply of cords extending between the bead portions and turned up around the bead core from the axially inside to the outside of the tire to form a pair of turnup portions and a main portion therebetween, a rubber bead apex disposed radially outside the bead core and between each said turnup portion and the main portion, a fiber reinforced rubber spacer interposed between the carcass ply cords and bead core wire, said fiber reinforced rubber spacer having a securing portion which extends radially outwardly and axially outwardly from the axially inside of the bead core while separating from the bead core but contacting with the rubber bead apex, and a distance (L1,L2) between an outmost point of said securing portion and the bead core being in a range of 0.05 to 1.0 times a height of the bead core, wherein said fiber reinforced rubber spacer is made of a single rubber strip reinforced with organic fibers, said single rubber strip is wound, starting from a position under the bead core, towards the axially inside of the tire, and after wound one or more times it is continuously wound towards the radially outside, but from a certain point, it separates from the previous winding and extends radially outward along the carcass ply main portion while contacting with an axially inside of the rubber bead apex, and said securing portion formed by this radially outwardly extending portion.

* * * * *